US012680580B2

(12) United States Patent
Ozawa

(10) Patent No.: US 12,680,580 B2
(45) Date of Patent: Jul. 14, 2026

(54) RATCHET TYPE CLUTCH DEVICE

(71) Applicant: NSK-WARNER K.K., Tokyo (JP)

(72) Inventor: Masataka Ozawa, Shizuoka (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 19/097,193

(22) Filed: Apr. 1, 2025

(65) Prior Publication Data

US 2025/0327495 A1 Oct. 23, 2025

(30) Foreign Application Priority Data

Apr. 23, 2024 (JP) ................................. 2024-069508

(51) Int. Cl.
*F16D 41/12* (2006.01)
*F16D 41/16* (2006.01)
(52) U.S. Cl.
CPC ............. *F16D 41/12* (2013.01); *F16D 41/16* (2013.01)
(58) Field of Classification Search
CPC ................................. F16D 41/12; F16D 41/16
See application file for complete search history.

(56) References Cited

U.S. PATENT DOCUMENTS

2024/0175471 A1* 5/2024 Katayama ............... F16D 41/14
2024/0191759 A1* 6/2024 Katayama ............... F16D 41/16

FOREIGN PATENT DOCUMENTS

JP 2020-197253 A 12/2020
JP 2021046893 A * 3/2021

OTHER PUBLICATIONS

Englsih language translation of JP-2020197253-A retrieved from PE2E Search on Nov. 29, 2025. (Year: 2025).*

* cited by examiner

*Primary Examiner* — Richard M Lorence
(74) *Attorney, Agent, or Firm* — Sughrue Mion, PLLC

(57) ABSTRACT

A ratchet type clutch device includes: an outer ring and an inner ring, in which the inner ring includes an outer peripheral surface having tooth portions, the outer ring having claw members that mesh with the tooth portions, each of the claw members includes a shaft portion, a claw portion meshing with one of the tooth portions, and a torque transmission unit projecting from the shaft portion, the shaft portion includes an outer peripheral surface including a first outer peripheral surface, the outer ring includes an outer peripheral holding surface, and a facing surface, the first outer peripheral surface is provided with a top portion, and when the claw portion meshes with the tooth portion, the claw portion is tilted with the top portion abutting on the outer peripheral holding surface, and the leading end surface of the torque transmission unit comes into contact with the facing surface.

12 Claims, 7 Drawing Sheets

FIG.4

RATCHET TYPE CLUTCH DEVICE

CROSS-REFERENCE TO RELATED APPLICATION(S)

The present application claims priority to and incorporates by reference the entire contents of Japanese Patent Application No. 2024-069508 filed in Japan on Apr. 23, 2024.

BACKGROUND

The present disclosure relates to a ratchet type clutch device.

A ratchet type clutch device includes an outer ring and an inner ring coaxially disposed. In the ratchet type clutch device of Japanese Laid-open Patent Publication No. 2020-197253 described below, a plurality of tooth portions is formed on an outer peripheral surface of an inner ring. An outer ring is provided with a plurality of claw members. A general claw member includes a shaft portion rotatably supported between an outer ring main body and a cage and a claw portion projecting from the shaft portion and meshing with a tooth portion.

Meanwhile, when the claw portion and the tooth portion mesh with each other, in a case where a contact area between the claw portion and the tooth portion is small, a surface pressure applied to the tooth portion increases. When such an operation continues, durability of the claw portion and the tooth portion is impaired. In order to solve this problem, each claw member of Japanese Laid-open Patent Publication No. 2020-197253 described below includes a torque transmission unit projecting from a shaft portion in a direction opposite to a claw portion in addition to the shaft portion and the claw portion. In addition, the outer ring is provided with a facing surface that faces a leading end surface of the torque transmission unit and abuts on the leading end surface of the torque transmission unit. When the claw portion meshes with a corresponding one of the tooth portions, the leading end surface of the torque transmission unit presses the facing surface, and torque is transmitted to the outer ring. In addition, the facing surface of the Japanese Laid-open Patent Publication No. 2020-197253 described below is provided with a projecting portion projecting toward the leading end surface of the torque transmission unit. The projecting portion guides the pressed torque transmission unit radially outward. That is, when the claw portion and the tooth portion mesh with each other, the torque transmission unit moves radially outward by the projecting portion (the claw member rotates). On the other hand, the claw portion on a side opposite to the torque transmission unit side moves radially inward, and a contact area between the claw portion and the tooth portion is increased.

SUMMARY

There is a need for providing a ratchet type clutch device in which a contact area between a claw portion and a tooth portion is reliably increased when the claw portion and the tooth portion mesh with each other.

According to an embodiment, a ratchet type clutch device includes: an outer ring and an inner ring coaxially disposed and relatively rotatable with respect to each other. Further, the inner ring includes an outer peripheral surface on which a plurality of tooth portions is formed, the outer ring is provided with a plurality of claw members that meshes with the tooth portions, each of the claw members includes a shaft portion rotatably supported by the outer ring, a claw portion projecting from the shaft portion and meshing with a corresponding one of the tooth portions, and a torque transmission unit projecting from the shaft portion in a direction opposite to the claw portion, the shaft portion includes an outer peripheral surface including a first outer peripheral surface disposed radially outside of a rotation center of the shaft portion, the outer ring includes an outer peripheral holding surface facing the first outer peripheral surface, and a facing surface facing a leading end surface of the torque transmission unit and separated from the leading end surface, the first outer peripheral surface is provided with a top portion located radially outermost from the rotation center of the shaft portion, and when the claw portion meshes with the tooth portion, the claw portion is tilted with the top portion abutting on the outer peripheral holding surface as a fulcrum, and the leading end surface of the torque transmission unit comes into contact with the facing surface.

BRIEF DESCRIPTION OF THE DRAWINGS

FIG. 4 is an enlarged view of a claw member and a vicinity thereof according to the embodiment;

DETAILED DESCRIPTION

In the related art, according to the technique of Japanese Laid-open Patent Publication No. 2020-197253 described above, when the claw portion and the tooth portion mesh with each other, there is a case where the claw member is sandwiched between the projecting portion and the tooth portion, and thus the torque transmission unit does not move radially outward (a case where the claw member does not rotate).

A mode for carrying out the present disclosure will be described in detail with reference to the drawings. The present disclosure is not limited by the contents described in the following description. In addition, the constituent elements described below include those that can be easily assumed by those skilled in the art and those that are substantially the same. Furthermore, the constituent elements described below can be appropriately combined.

Figure 1:
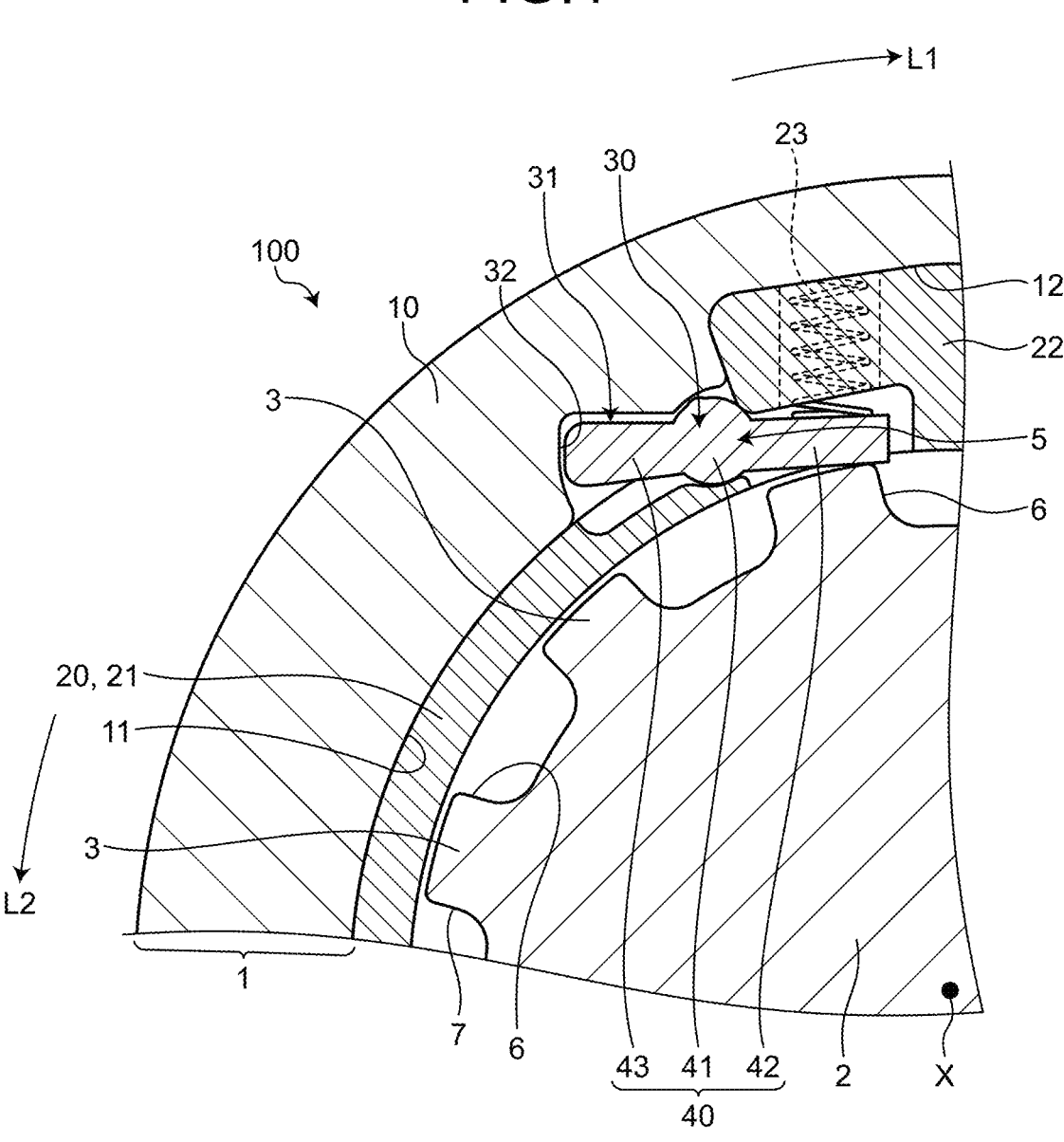
FIG. 1 is a schematic view in which a part of a cross section of a ratchet type clutch device according to an embodiment taken along a direction orthogonal to an axial direction is enlarged.

FIG. 1 is a cross-sectional view of a ratchet type clutch device according to an embodiment taken along a direction orthogonal to an axial direction and is a schematic view in which a part thereof is enlarged. First, a basic configuration of a ratchet type clutch device 100 will be described. The ratchet type clutch device 100 includes an annular outer ring 1 and an inner ring 2 disposed inside the outer ring 1. The outer ring 1 and the inner ring 2 are coaxially disposed and are disposed so as to be relatively rotatable around a central axis X. Hereinafter, a direction parallel to the central axis X is referred to as an axial direction. A direction orthogonal to the central axis X is referred to as a radial direction.

On an outer peripheral surface of the inner ring 2, a tooth portion 3 projecting radially outward is formed in a circumferential direction. The tooth portion 3 includes a first side surface 6 facing one side in the circumferential direction and a second side surface 7 facing another side in the circumferential direction. Hereinafter, with respect to a rotation direction (the circumferential direction) around the central axis X, a direction in which the first side surface 6 faces is referred to as a first rotation direction L1, and a direction in which the second side surface 7 faces is referred to as a second rotation direction L2.

The outer ring 1 includes an annular outer ring main body 10, an annular cage 20 disposed on an inner peripheral side of the outer ring main body 10, and a plurality of claw members 40. An inner peripheral surface 11 of the outer ring main body 10 is circular around the central axis X. A fitted portion 12 recessed radially outward is formed on the inner peripheral surface 11 of the outer ring main body 10. The cage 20 includes a cage main body 21 extending along the inner peripheral surface 11 of the outer ring main body 10 and a fitting portion 22 fitted to the fitted portion 12 of the outer ring main body 10.

The cage main body 21 and the fitting portion 22 are separated from each other. A space between the cage main body 21 and the fitting portion 22 is an opening 5 for disposing a part (a claw portion 42) of the claw member 40 radially inside the cage 20. A shaft portion accommodating portion 30 is formed between the outer ring main body 10 and the cage 20 and in a portion adjacent to the opening 5. In addition, an extended accommodating portion 31 is formed between the outer ring main body 10 and the cage 20 in a direction opposite to the opening 5 when viewed from the shaft portion accommodating portion 30. In the present embodiment, the opening 5, the shaft portion accommodating portion 30, and the extended accommodating portion 31 are arranged in this order from the first rotation direction L1 toward the second rotation direction L2.

The claw member 40 includes a shaft portion 41 accommodated in the shaft portion accommodating portion 30, the claw portion 42 projecting from the shaft portion 41, and a torque transmission unit 43 disposed in the extended accommodating portion 31. The shaft portion 41 is rotatably supported by the shaft portion accommodating portion 30. The claw portion 42 passes through the opening 5 and is disposed on an inner peripheral side of the cage 20. The claw portion 42 is constantly urged radially inward by a spring 23 provided in the fitting portion 22. The torque transmission unit 43 faces a facing surface 32 of an inner surface of the extended accommodating portion 31. The facing surface 32 faces in the first rotation direction L1.

Figure 2:
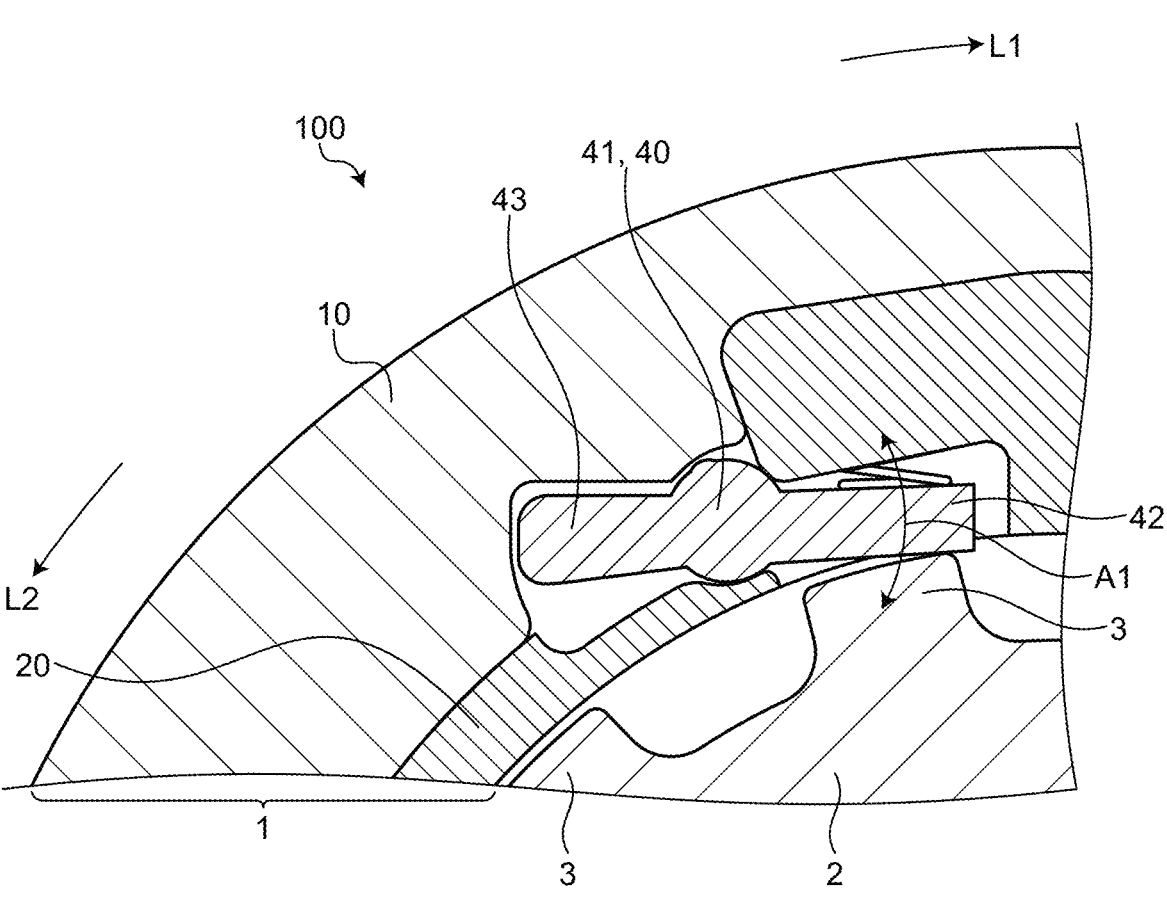
FIG. 2 is a schematic view illustrating a state in which an inner ring rotates relative to an outer ring in a first rotation direction in the ratchet type clutch device according to the embodiment.

FIG. 2 is a schematic view illustrating a state in which the inner ring rotates relative to the outer ring in the first rotation direction L1 in the ratchet type clutch device according to the embodiment. As illustrated in FIG. 2, in the ratchet type clutch device 100, when the inner ring 2 rotates relative to the outer ring 1 in the first rotation direction L1, the claw portion 42 rides up on the tooth portion 3 or enters between the tooth portions 3, so that the claw member 40 swings (see an arrow A1 in FIG. 2). Therefore, torque is not transmitted from the inner ring 2 to the outer ring 1.

Figure 3:
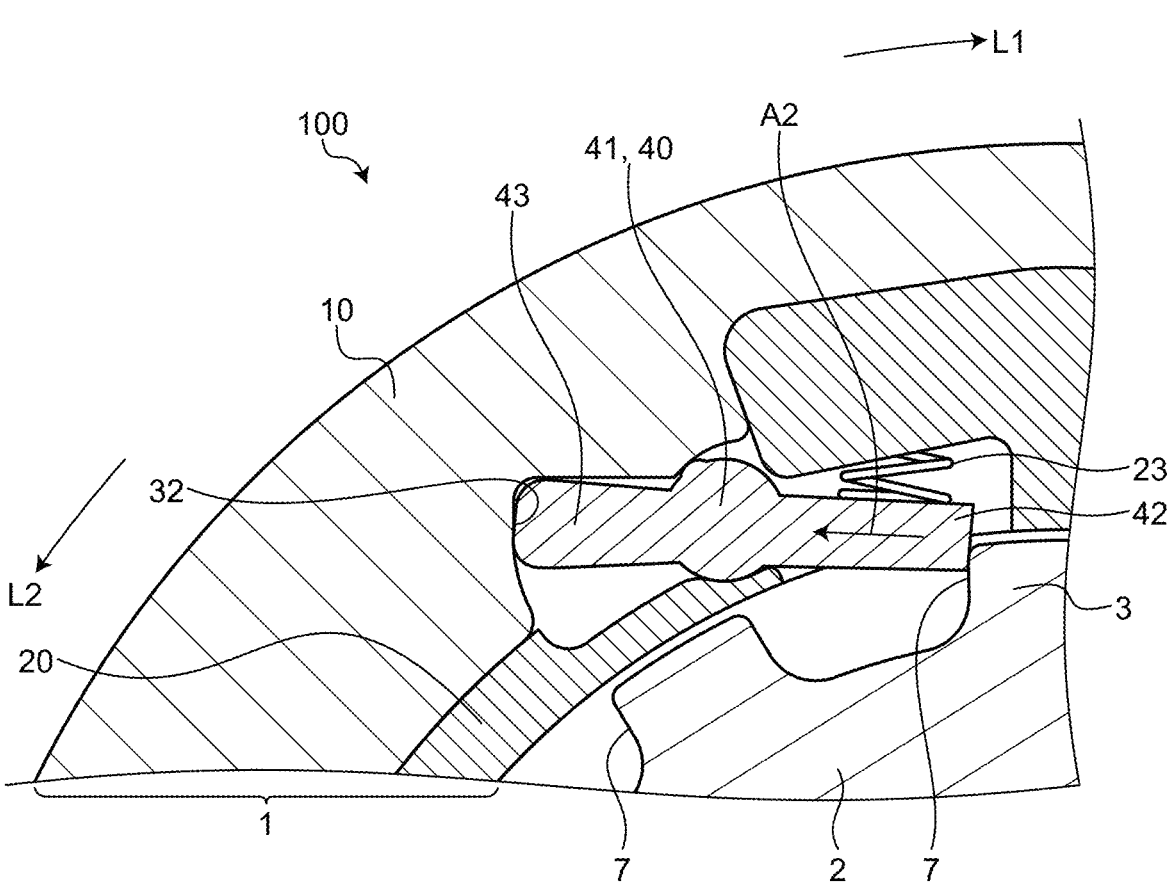
FIG. 3 is a schematic view illustrating a state in which the inner ring rotates relative to the outer ring in the second rotation direction in the ratchet type clutch device according to the embodiment.

FIG. 3 is a schematic view illustrating a state in which the inner ring rotates relative to the outer ring in the second rotation direction L2 in the ratchet type clutch device according to the embodiment. As illustrated in FIG. 3, when the inner ring 2 rotates relative to the outer ring 1 in the second rotation direction L2, the claw portion 42 biased by the spring 23 enters between the tooth portions 3 of the inner ring 2. Then, the claw portion 42 comes into contact with the second side surface 7 of a corresponding one of the tooth portions 3, and the claw member 40 is pressed (see an arrow A2 in FIG. 3). Therefore, the torque transmission unit 43 presses the facing surface 32, and the torque is transmitted to the outer ring main body 10. As a result, the outer ring 1 rotates in the second rotation direction L2 at the same speed as the inner ring 2.

The ratchet type clutch device 100 has the above-described basic configuration. Next, details of the claw member 40, the shaft portion accommodating portion 30, and the extended accommodating portion 31 will be described.

Figure 4:
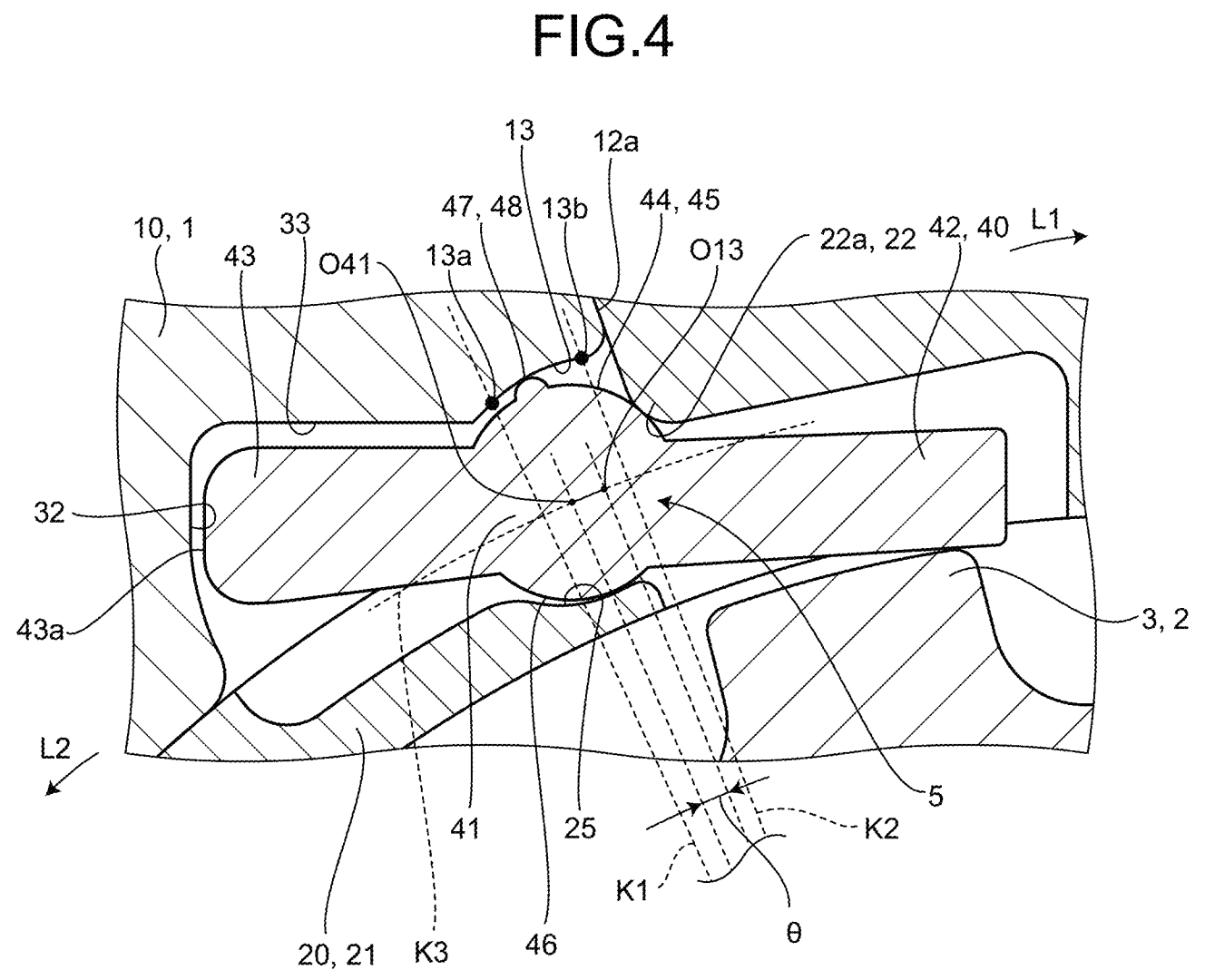

FIG. 4 is an enlarged view of the claw member and a vicinity thereof according to the embodiment. As illustrated in FIG. 4, the shaft portion 41 of the claw member 40 is formed in a columnar shape when viewed in the axial direction in order to facilitate rotation. That is, an outer peripheral surface 44 of the shaft portion 41 is formed in a circular shape around a rotation center O41 of the shaft portion 41.

The outer peripheral surface 44 of the shaft portion 41 is provided with the claw portion 42 and the torque transmission unit 43. Therefore, the outer peripheral surface 44 is divided into a first outer peripheral surface 45 disposed radially outside the rotation center O41 and a second outer peripheral surface 46 disposed radially inside the rotation center O41. An outer diameter of the shaft portion 41 is larger than a width of the opening 5. As a result, it is avoided that the shaft portion 41 (the claw member 40) falls off from the opening 5 to the inner peripheral side of the cage 20.

A projecting portion 47 projecting radially outward is formed on the first outer peripheral surface 45. A portion of the projecting portion 47 disposed radially outermost is referred to as a top portion 48. An outer shape of the projecting portion 47 has an arc shape when viewed in the axial direction.

An inner surface of the shaft portion accommodating portion 30 includes an outer peripheral surface (hereinafter, referred to as an inner peripheral holding surface 25) of the cage main body 21, a corner portion 22*a* of the fitting portion 22, and an inner peripheral surface (hereinafter, referred to as an outer peripheral holding surface 13) of the outer ring main body 10.

The inner peripheral holding surface 25 is a part of the outer peripheral surface of the cage main body 21 and is formed at a position close to the opening 5. The inner peripheral holding surface 25 faces the second outer peripheral surface 46 of the shaft portion 41. The inner peripheral holding surface 25 is formed in an arc shape around the rotation center O41 of the shaft portion 41. The corner portion 22*a* of the fitting portion 22 faces the first outer peripheral surface 45 of the shaft portion 41. The corner portion 22*a* of the fitting portion 22 has an arc shape.

The outer peripheral holding surface 13 is a part of the inner peripheral surface of the outer ring main body 10 and extends in the second rotation direction L2 from a side surface 12*a* of the fitted portion 12. The outer peripheral holding surface 13 is formed in an arc shape around a center O13 of the outer peripheral holding surface 13 when viewed in the axial direction.

As illustrated in FIG. 4, a first virtual line K1 is a virtual line (a straight line) drawn from the central axis X (see FIG. 1) of the outer ring 1 to a first end 13*a* of the outer peripheral holding surface 13. A second virtual line K2 is a virtual line (a straight line) drawn from the central axis X (see FIG. 1) of the outer ring 1 to a second end 13*b* of the outer peripheral holding surface 13. The projecting portion 47 (the top portion 48) is arranged between the first virtual line K1 and the second virtual line K2. Therefore, the projecting portion 47 (the top portion 48) faces the outer peripheral holding surface 13.

A virtual circle K3 illustrated in FIG. 4 is a virtual circle centered on the central axis X (see FIG. 1) of the outer ring 1 and passing through the rotation center O41 of the shaft portion 41. The center O13 of the outer peripheral holding surface 13 is arranged on the virtual circle K3. That is, the center O13 of the outer peripheral holding surface 13 and the rotation center O41 of the shaft portion 41 have the same distance from the central axis X (see FIG. 1) of the outer ring 1. The center O13 of the outer peripheral holding surface 13 is shifted in the first rotation direction L1 from the rotation center O41 of the shaft portion 41. In other words, an angle formed by the center O13 of the outer peripheral holding surface 13 and the rotation center O41 of the shaft portion 41 is θ°.

A leading end surface 43*a* of the torque transmission unit 43 faces the facing surface 32 of the extended accommodating portion 31. The leading end surface 43*a* of the torque transmission unit 43 and the facing surface 32 are separated from each other. Therefore, a gap is formed between the leading end surface 43*a* and the facing surface 32. A regulating surface 33 of the extended accommodating portion 31 is formed radially outside the torque transmission unit 43. When the torque transmission unit 43 moves radially outward, the torque transmission unit 43 comes into contact with the regulating surface 33, and the rotation of the claw member 40 is regulated.

In order to enable contact (torque transmission) between the torque transmission unit 43 and the facing surface 32, a gap is formed between the inner surface (the inner peripheral holding surface 25, the corner portion 22*a* of the fitting portion 22, and the outer peripheral holding surface 13) of the shaft portion accommodating portion 30 and the shaft portion 41.

Figure 5:
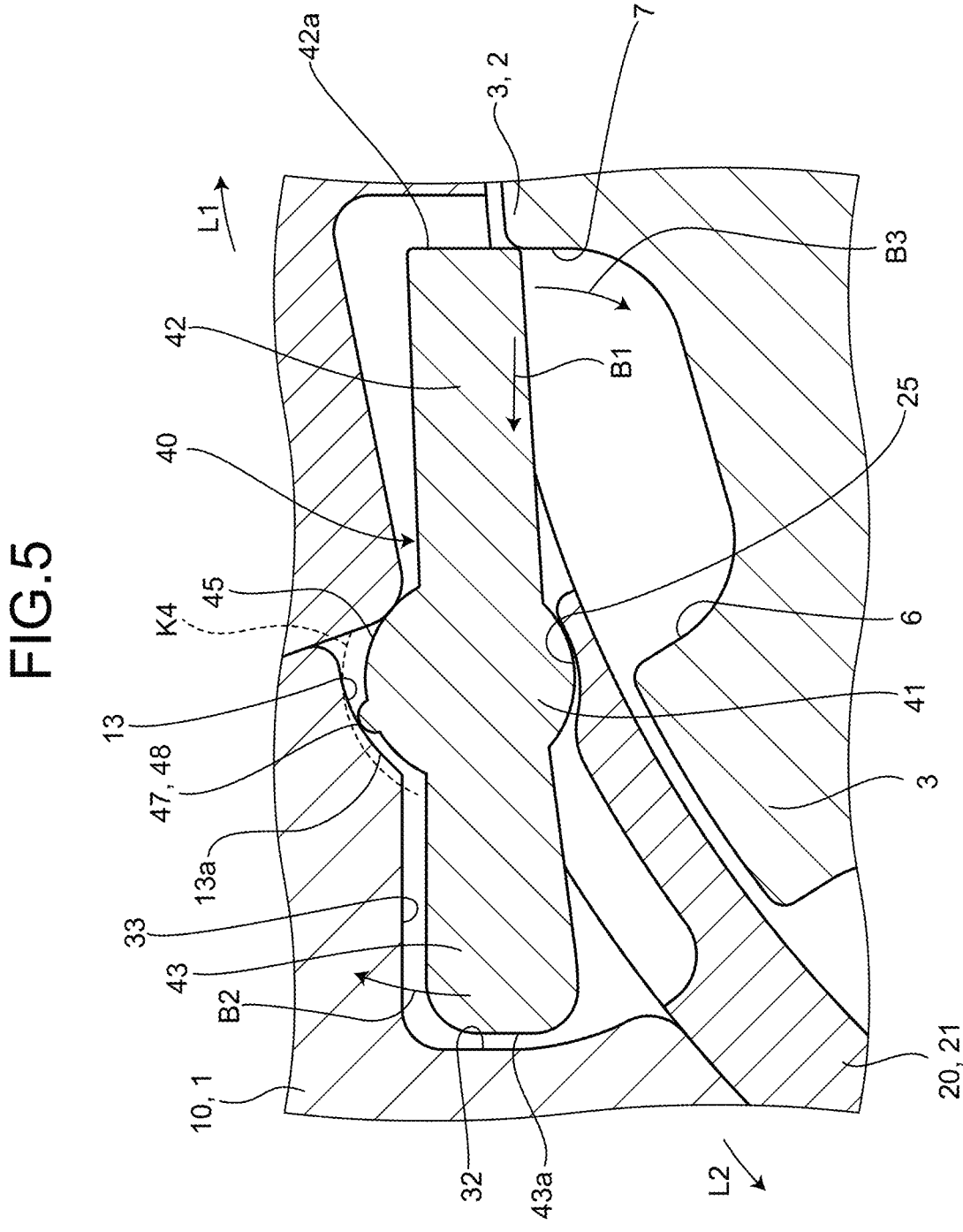
FIG. 5 is a schematic view at a time when a claw portion and a tooth portion come into contact with each other in the embodiment.
Figure 6:
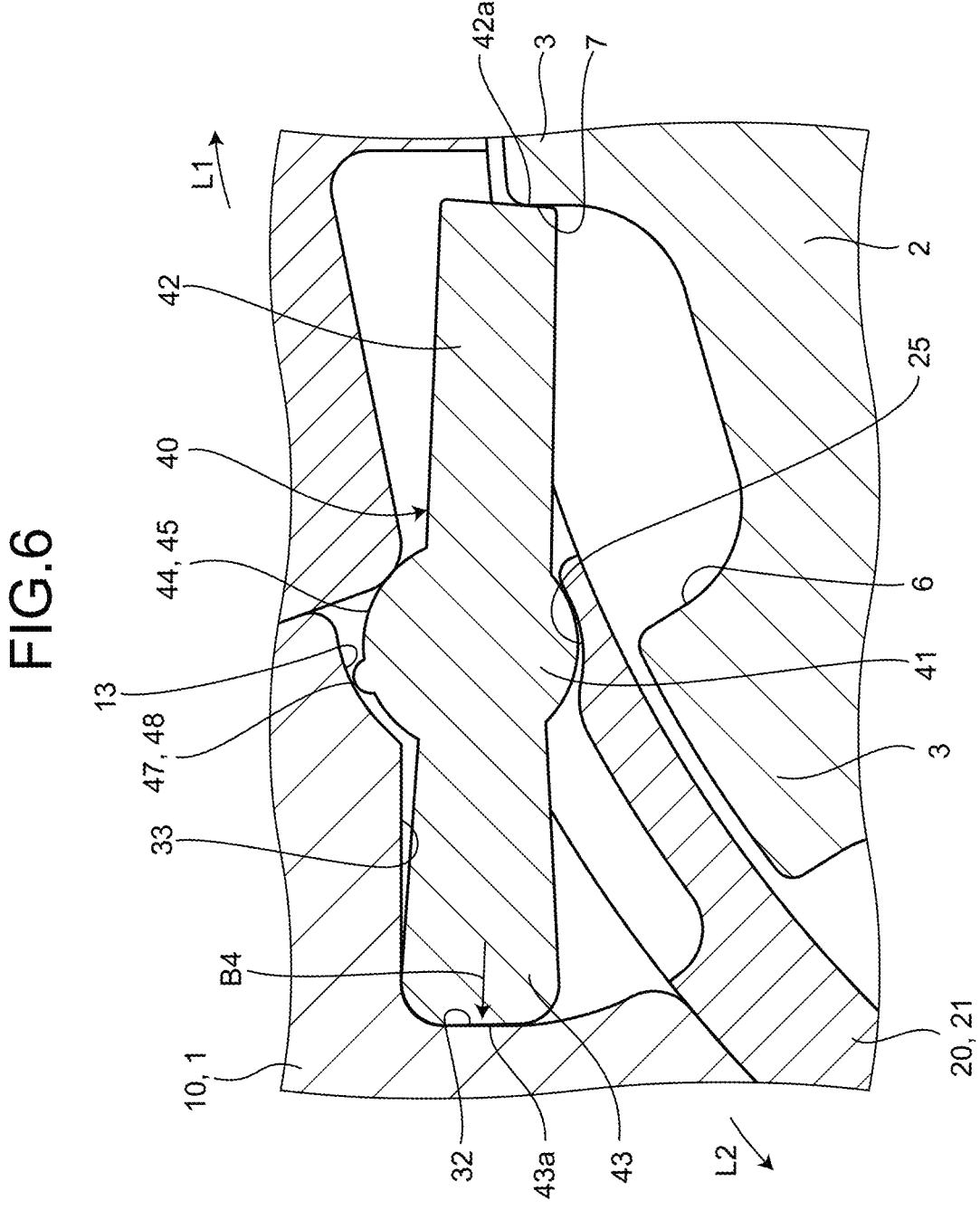
FIG. 6 is a schematic view at a time when a torque transmission unit and a facing surface come into contact with each other in the embodiment.

Next, an operation when the claw portion 42 and the tooth portion 3 mesh with each other will be described. FIG. 5 is a schematic view at a time when the claw portion and the tooth portion come into contact with each other in the embodiment. FIG. 6 is a schematic view at a time when the torque transmission unit and the facing surface come into contact with each other in the embodiment.

As illustrated in FIG. 5, when the inner ring 2 rotates in the second rotation direction L2 with respect to the outer ring 1, the second side surface 7 of the tooth portion 3 comes into contact with a leading end surface 42*a* of the claw portion 42. As a result, the claw member 40 receives a load B1 from the tooth portion 3. A direction of the load B1 is a direction orthogonal to the second side surface 7. In addition, a gap is formed between the leading end surface 43*a* of the torque transmission unit 43 and the facing surface 32. Therefore, the claw member 40 moves in the direction of the load B1.

Here, the projecting portion 47 is formed on the first outer peripheral surface 45 of the shaft portion 41. Therefore, when the claw member 40 moves in the direction of the load B1, the top portion 48 of the projecting portion 47 is pressed against the outer peripheral holding surface 13, and the claw member 40 tilts with the top portion 48 as a fulcrum. That is, while the torque transmission unit 43 moves radially outward (see an arrow B2 in FIG. 5), the claw portion 42 moves radially inward (see an arrow B3 in FIG. 5).

Then, as illustrated in FIG. 6, when the leading end surface 43*a* of the torque transmission unit 43 comes into contact with the facing surface 32, the torque is transmitted to the outer ring main body 10 (see the arrow B4), and the outer ring 1 rotates in the second rotation direction L2. When the leading end surface 43*a* of the torque transmission unit 43 comes into contact with the facing surface 32, the claw member 40 stops tilting.

From the above description, according to the present embodiment, a contact area between the claw portion 42 and the tooth portion 3 is larger when the torque transmission unit 43 and the facing surface 32 come into contact with each other (see FIG. 6) than when the claw portion 42 and the tooth portion 3 come into contact with each other (see FIG. 5). Therefore, a surface pressure at the time of contact between the tooth portion 3 and the claw portion 42 is reduced, and durability of the claw portion 42 and the tooth portion 3 is improved.

In addition, a gap is formed between the torque transmission unit 43 and the facing surface 32. As a result, a time from when the claw portion 42 comes into contact with the tooth portion 3 to when the torque transmission unit 43 comes into contact with the facing surface 32, that is, a time during which the claw member 40 tilts is secured. Therefore, the contact area between the claw portion 42 and the tooth portion 3 is reliably increased.

Although not particularly illustrated, when the contact area between the claw portion 42 and the tooth portion 3 is already large at the time when the claw portion 42 and the tooth portion 3 come into contact with each other (when the torque transmission unit 43 is in contact with the regulating surface 33), the claw member 40 moves linearly in the direction of the load B1, and the leading end surface 43*a* of the torque transmission unit 43 comes into contact with the facing surface 32. Therefore, the claw member 40 does not tilt.

A virtual line K4 in FIG. 5 indicates the outer peripheral holding surface 13 when the center O13 of the outer peripheral holding surface 13 is coaxial with the rotation center O41 of the shaft portion 41. When the claw member 40 moves toward the facing surface 32, the top portion 48 may slide along the outer peripheral holding surface 13 without being caught by the outer peripheral holding surface 13 (the claw member 40 may not tilt). In the present embodiment, in order to prevent the above-described situation, the center O13 of the outer peripheral holding surface 13 is arranged to be shifted in the first rotation direction L1 from the rotation center O41 of the shaft portion 41. According to this configuration, the first end 13*a* of the outer peripheral holding surface 13 is arranged radially inward as compared with the case where the center O13 of the outer peripheral holding surface 13 is coaxial with the rotation center O41 of the shaft portion 41 (see the virtual line K4 in FIG. 5). As a result, the projecting portion 47 (the top portion 48) is easily caught by the outer peripheral holding surface 13, and the claw member 40 is reliably tilted. A range of the angle θ formed by the center O13 of the outer peripheral holding surface 13 and the rotation center O41 of the shaft portion 41 is not particularly limited, but is preferably in a range of 0.1° or more and 5.0° or less.

The embodiment has been described above, but the present disclosure is not limited to the examples described in the embodiment. For example, the projecting portion 47 of the embodiment has an arc shape when viewed in the axial direction, but in the present disclosure, the projecting portion 47 (the top portion 48) only needs to be a fulcrum for tilting the claw member 40 and may have a triangular shape, a quadrangular shape, or the like. That is, the shape of the projecting portion 47 (the top portion 48) is not particularly limited. In addition, the first outer peripheral surface 45 of the embodiment also has an arc shape (a circular shape) when viewed in the axial direction, but the present disclosure is not limited thereto.

In addition, the outer peripheral holding surface 13 of the embodiment also has an arc shape (a circular shape) when viewed in the axial direction, but the present disclosure is not limited thereto. For example, a recessed portion or a projecting portion may be formed on the outer peripheral holding surface 13 in order to make it difficult for the top portion 48 of the projecting portion 47 to slide at the time of contact between the claw portion 42 and the tooth portion 3 (to reliably tilt the claw member 40).

In the embodiment, in order to tilt the claw member 40 more reliably, the center O13 of the outer peripheral holding surface 13 is arranged to be shifted in the first rotation direction L1 from the rotation center O41 of the shaft portion 41, but the present disclosure is not limited thereto. That is, the center O13 of the outer peripheral holding surface 13 and the rotation center O41 of the shaft portion 41 may be coaxial as long as the claw member 40 is highly likely to tilt.

Figure 7:
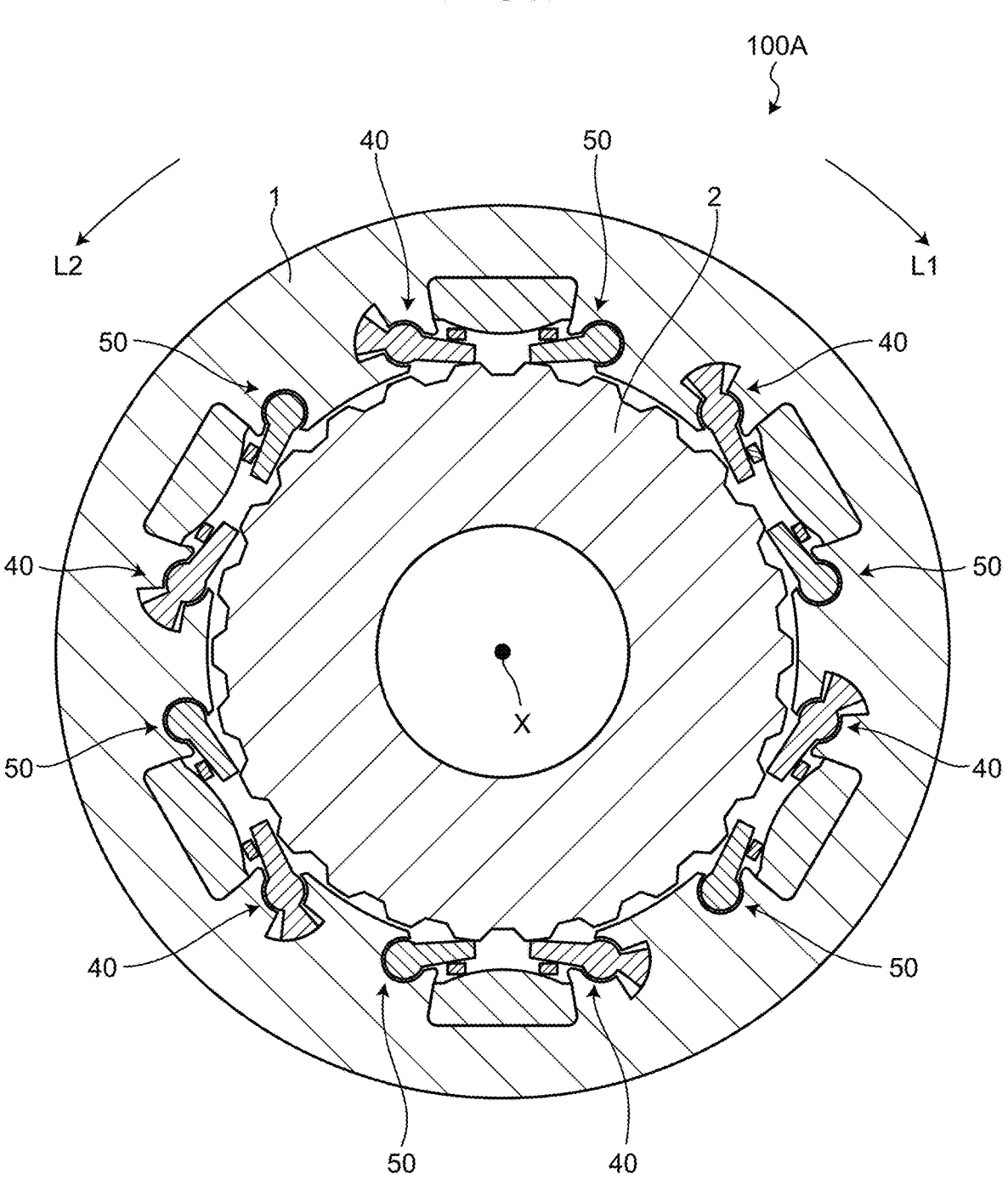
FIG. 7 is a cross-sectional view of a ratchet type clutch device according to another embodiment taken along the direction orthogonal to the axial direction.

In the present embodiment, a case where the present disclosure is applied to a ratchet type clutch device (ratchet type one-way clutch device) in which the torque of the inner ring 2 is transmitted to the outer ring 1 only when the inner ring 2 rotates relative to the outer ring 1 in the second rotation direction L2 is given as an example, but the present disclosure is not limited thereto. FIG. 7 is a cross-sectional view of a ratchet type clutch device 100A according to another embodiment taken along the direction orthogonal to the axial direction. For example, as illustrated in FIG. 7, the ratchet type clutch device 100A includes a plurality of first claw members (the claw members 40) and a plurality of second claw members 50. Each first claw member is the claw member 40 described in the embodiment and meshes with the tooth portion 3 in the second rotation direction L2. Each second claw member 50 meshes with the tooth portion 3 in the first rotation direction L1. Therefore, in the ratchet type clutch device 100A, even when the inner ring 2 rotates relative to the outer ring 1 in either the first rotation direction L1 or the second rotation direction L2, the torque is transmitted to the outer ring 1 (the outer ring 1 is locked in both directions). The present disclosure may be applied to the ratchet type clutch device 100A described above. In addition, the second claw member 50 in FIG. 7 includes only the shaft portion and the claw portion, but the type of the second claw member 50 is not particularly limited in the present disclosure. Therefore, the second claw member 50 may be a claw member (a claw member having the same shape as the claw member 40) having the projecting portion 47 (the top portion 48).

The present disclosure may be a combination of the following configurations.

(1). A ratchet type clutch device including:

an outer ring and an inner ring coaxially disposed and relatively rotatable with respect to each other, wherein the inner ring includes an outer peripheral surface on which a plurality of tooth portions is formed, the outer ring is provided with a plurality of claw members that meshes with the tooth portions, each of the claw members includes a shaft portion rotatably supported by the outer ring, a claw portion projecting from the shaft portion and meshing with a corresponding one of the tooth portions, and a torque transmission unit projecting from the shaft portion in a direction opposite to the claw portion, the shaft portion includes an outer peripheral surface including a first outer peripheral surface disposed radially outside of a rotation center of the shaft portion, the outer ring includes an outer peripheral holding surface facing the first outer peripheral surface, and a facing surface facing a leading end surface of the torque transmission unit and separated from the leading end surface, the first outer peripheral surface is provided with a top portion located radially outermost from the rotation center of the shaft portion, and when the claw portion meshes with the tooth portion, the claw portion is tilted with the top portion abutting on the outer peripheral holding surface as a fulcrum, and the leading end surface of the torque transmission unit comes into contact with the facing surface.

(2) The ratchet type clutch device according to (1), in which when an axial direction is a direction parallel to a central axis of the outer ring, the first outer peripheral surface is formed in an arc shape when viewed in the axial direction.

(3) The ratchet type clutch device according to (1), in which the first outer peripheral surface is provided with a projecting portion projecting radially outward, and the projecting portion has a radially outer end that is the top portion.

(4) The ratchet type clutch device according to (3), in which when an axial direction is a direction parallel to a central axis of the outer ring, the projecting portion has an arc shape when viewed in the axial direction.

(5) The ratchet type clutch device according to any one of (1) through (4), in which when a first virtual line is a virtual line drawn from a central axis of the outer ring to a first end of the outer peripheral holding surface, and a second virtual line is a virtual line drawn from the central axis of the outer ring to a second end of the outer peripheral holding surface, the top portion is arranged between the first virtual line and the second virtual line.

(6) The ratchet type clutch device according to any one of (1) through (4), in which when an axial direction is a direction parallel to a central axis of the outer ring, and a first rotation direction is a rotation direction around the central axis and a direction in which the claw portion is disposed when viewed from the shaft portion, the outer peripheral holding surface is formed in an arc shape when viewed in the axial direction, a center of the outer peripheral holding surface and a center of the shaft portion have a same distance from the central axis of the outer ring, and

the center of the outer peripheral holding surface is arranged to be shifted in the first rotation direction from the center of the shaft portion.

According to the present disclosure, when the claw portion and the tooth portion mesh with each other, the claw member tilts with the top portion as a fulcrum. That is, while the torque transmission unit moves radially outward, the claw portion moves radially inward. Therefore, a contact area between the claw portion and the tooth portion is increased. In addition, the leading end surface of the torque transmission unit and the facing surface are separated from each other. Therefore, when the claw portion and the tooth portion mesh with each other, a situation in which the claw member is sandwiched between the projecting portion and the tooth portion, and the claw member does not tilt does not occur. As a result, the contact area between the claw portion and the tooth portion is reliably increased.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ratchet clutch device comprising:
an outer ring and an inner ring coaxially disposed and relatively rotatable with respect to each other, wherein
the inner ring includes an outer peripheral surface on which a plurality of tooth portions is formed,
the outer ring is provided with a plurality of claw members that meshes with the tooth portions,
each of the claw members includes
a shaft portion rotatably supported by the outer ring,
a claw portion projecting from the shaft portion and meshing with a corresponding one of the tooth portions, and
a torque transmission unit projecting from the shaft portion in a direction opposite to the claw portion,
the shaft portion includes an outer peripheral surface including a first outer peripheral surface disposed radially outside of a rotation center of the shaft portion,
the outer ring includes
an outer peripheral holding surface facing the first outer peripheral surface, and
a facing surface facing a leading end surface of the torque transmission unit and separated from the leading end surface,
the first outer peripheral surface is provided with a top portion located radially outermost from the rotation center of the shaft portion,
when the claw portion meshes with the tooth portion, the claw portion is tilted with the top portion abutting on the outer peripheral holding surface as a fulcrum, and the leading end surface of the torque transmission unit comes into contact with the facing surface,
the first outer peripheral surface is provided with a projecting portion projecting radially outward, and
the projecting portion has a radially outer end that is the top portion.

2. The ratchet clutch device according to claim 1, wherein
an axial direction is a direction parallel to a central axis of the outer ring, and
the first outer peripheral surface is formed in an arc shape when viewed in the axial direction.

3. The ratchet clutch device according to claim 2, wherein

10 a first virtual line is a virtual line drawn from a central axis of the outer ring to a first end of the outer peripheral holding surface,
a second virtual line is a virtual line drawn from the central axis of the outer ring to a second end of the outer peripheral holding surface, and
the top portion is arranged between the first virtual line and the second virtual line.

4. The ratchet clutch device according to claim 3, wherein the projecting portion has an arc shape when viewed in the axial direction.

5. The ratchet clutch device according to claim 1, wherein
an axial direction is a direction parallel to a central axis of the outer ring, and
the projecting portion has an arc shape when viewed in the axial direction.

6. The ratchet clutch device according to claim 5, wherein
a first virtual line is a virtual line drawn from a central axis of the outer ring to a first end of the outer peripheral holding surface,
a second virtual line is a virtual line drawn from the central axis of the outer ring to a second end of the outer peripheral holding surface, and
the top portion is arranged between the first virtual line and the second virtual line.

7. The ratchet type clutch device according to claim 5, wherein
an axial direction is a direction parallel to a central axis of the outer ring,
a first rotation direction is a rotation direction around the central axis and a direction in which the claw portion is disposed when viewed from the shaft portion,
the outer peripheral holding surface is formed in an arc shape when viewed in the axial direction,
a center of the outer peripheral holding surface and a center of the shaft portion have a same distance from the central axis of the outer ring, and
the center of the outer peripheral holding surface is arranged to be shifted in the first rotation direction from the center of the shaft portion.

8. The ratchet clutch device according to claim 1, wherein
a first virtual line is a virtual line drawn from a central axis of the outer ring to a first end of the outer peripheral holding surface,
a second virtual line is a virtual line drawn from the central axis of the outer ring to a second end of the outer peripheral holding surface, and
the top portion is arranged between the first virtual line and the second virtual line.

9. The ratchet type clutch device according to claim 1, wherein
an axial direction is a direction parallel to a central axis of the outer ring,
a first rotation direction is a rotation direction around the central axis and a direction in which the claw portion is disposed when viewed from the shaft portion,
the outer peripheral holding surface is formed in an arc shape when viewed in the axial direction,
a center of the outer peripheral holding surface and a center of the shaft portion have a same distance from the central axis of the outer ring, and
the center of the outer peripheral holding surface is arranged to be shifted in the first rotation direction from the center of the shaft portion.

10. A ratchet clutch device comprising:
an outer ring and an inner ring coaxially disposed and relatively rotatable with respect to each other, wherein the inner ring includes an outer peripheral surface on which a plurality of tooth portions is formed, the outer ring is provided with a plurality of claw members that meshes with the tooth portions, each of the claw members includes a shaft portion rotatably supported by the outer ring, a claw portion projecting from the shaft portion and meshing with a corresponding one of the tooth portions, and a torque transmission unit projecting from the shaft portion in a direction opposite to the claw portion, the shaft portion includes an outer peripheral surface including a first outer peripheral surface disposed radially outside of a rotation center of the shaft portion, the outer ring includes an outer peripheral holding surface facing the first outer peripheral surface, and a facing surface facing a leading end surface of the torque transmission unit and separated from the leading end surface, the first outer peripheral surface is provided with a top portion located radially outermost from the rotation center of the shaft portion, when the claw portion meshes with the tooth portion, the claw portion is tilted with the top portion abutting on the outer peripheral holding surface as a fulcrum, and the leading end surface of the torque transmission unit comes into contact with the facing surface, an axial direction is a direction parallel to a central axis of the outer ring, a first rotation direction is a rotation direction around the central axis and a direction in which the claw portion is disposed when viewed from the shaft portion, the outer peripheral holding surface is formed in an arc shape when viewed in the axial direction, a center of the outer peripheral holding surface and a center of the shaft portion have a same distance from the central axis of the outer ring, and the center of the outer peripheral holding surface is arranged to be shifted in the first rotation direction from the center of the shaft portion.

11. A ratchet clutch device comprising:

an outer ring and an inner ring coaxially disposed and relatively rotatable with respect to each other, wherein the inner ring includes an outer peripheral surface on which a plurality of tooth portions is formed, the outer ring is provided with a plurality of claw members that meshes with the tooth portions, each of the claw members includes a shaft portion rotatably supported by the outer ring, a claw portion projecting from the shaft portion and meshing with a corresponding one of the tooth portions, and a torque transmission unit projecting from the shaft portion in a direction opposite to the claw portion, the shaft portion includes an outer peripheral surface including a first outer peripheral surface disposed radially outside of a rotation center of the shaft portion, the outer ring includes an outer peripheral holding surface facing the first outer peripheral surface, and a facing surface facing a leading end surface of the torque transmission unit and separated from the leading end surface, the first outer peripheral surface is provided with a top portion located radially outermost from the rotation center of the shaft portion, when the claw portion meshes with the tooth portion, the claw portion is tilted with the top portion abutting on the outer peripheral holding surface as a fulcrum, and the leading end surface of the torque transmission unit comes into contact with the facing surface, an axial direction is a direction parallel to a central axis of the outer ring, the first outer peripheral surface is formed in an arc shape when viewed in the axial direction, a first rotation direction is a rotation direction around the central axis and a direction in which the claw portion is disposed when viewed from the shaft portion, the outer peripheral holding surface is formed in an arc shape when viewed in the axial direction, a center of the outer peripheral holding surface and a center of the shaft portion have a same distance from the central axis of the outer ring, and the center of the outer peripheral holding surface is arranged to be shifted in the first rotation direction from the center of the shaft portion.

12. The ratchet clutch device according to claim 11, wherein the first outer peripheral surface is provided with a projecting portion projecting radially outward, the projecting portion has a radially outer end that is the top portion, and the projecting portion has an arc shape when viewed in the axial direction.

\* \* \* \* \*